United States Patent [19]

Copeland

[11] Patent Number: 4,628,731
[45] Date of Patent: Dec. 16, 1986

[54] FOG-RESISTANT GAUGE

[75] Inventor: Leonard H. Copeland, York, Pa.

[73] Assignee: Datcon Instrument Company, East Petersburg, Pa.

[21] Appl. No.: 818,593

[22] Filed: Jan. 13, 1986

[51] Int. Cl.⁴ .................... G01D 11/24; G01D 11/26
[52] U.S. Cl. ........................................ 73/431; 116/305
[58] Field of Search ................. 73/431, 432 AD, 325; 374/208; 116/305; 324/156; 340/691, 693

[56] References Cited

U.S. PATENT DOCUMENTS

| | | | |
|---|---|---|---|
| 2,238,071 | 4/1941 | Nazar | 73/432 AD X |
| 2,416,780 | 3/1947 | Tellier | 324/156 |
| 2,426,712 | 9/1947 | Simpson | 324/156 |
| 2,701,969 | 2/1955 | Meredith | 73/431 |
| 2,773,388 | 12/1956 | Prosser | 73/431 |
| 3,530,723 | 9/1970 | Hogue et al. | 73/431 |
| 3,659,457 | 5/1972 | Ostrowski | 73/431 X |
| 3,795,148 | 3/1974 | Luich | 73/431 |
| 3,921,569 | 11/1975 | Miller et al. | 116/286 |
| 4,333,348 | 6/1982 | Berninger | 73/431 X |

Primary Examiner—Stewart J. Levy
Assistant Examiner—Tom Noland
Attorney, Agent, or Firm—Lowe, Price, LeBlanc Becker & Shur

[57] ABSTRACT

An improved gauge design is presented wherein the tendency of fogging of the lenses is eliminated or reduced. The gauge of this invention includes an inner lens spaced between the dial and outer lens and a surrounding baffle which is disposed between the lens and the inner surface of the gauge case. The baffle restricts air flow into and out of the space between the two lenses. In addition, both the inner and outer lens preferably are coated with a clear anti-fog coating. Finally, the port in the gauge within which the needle is mounted is surrounded with a sleeve to further restrict air flow.

6 Claims, 4 Drawing Figures

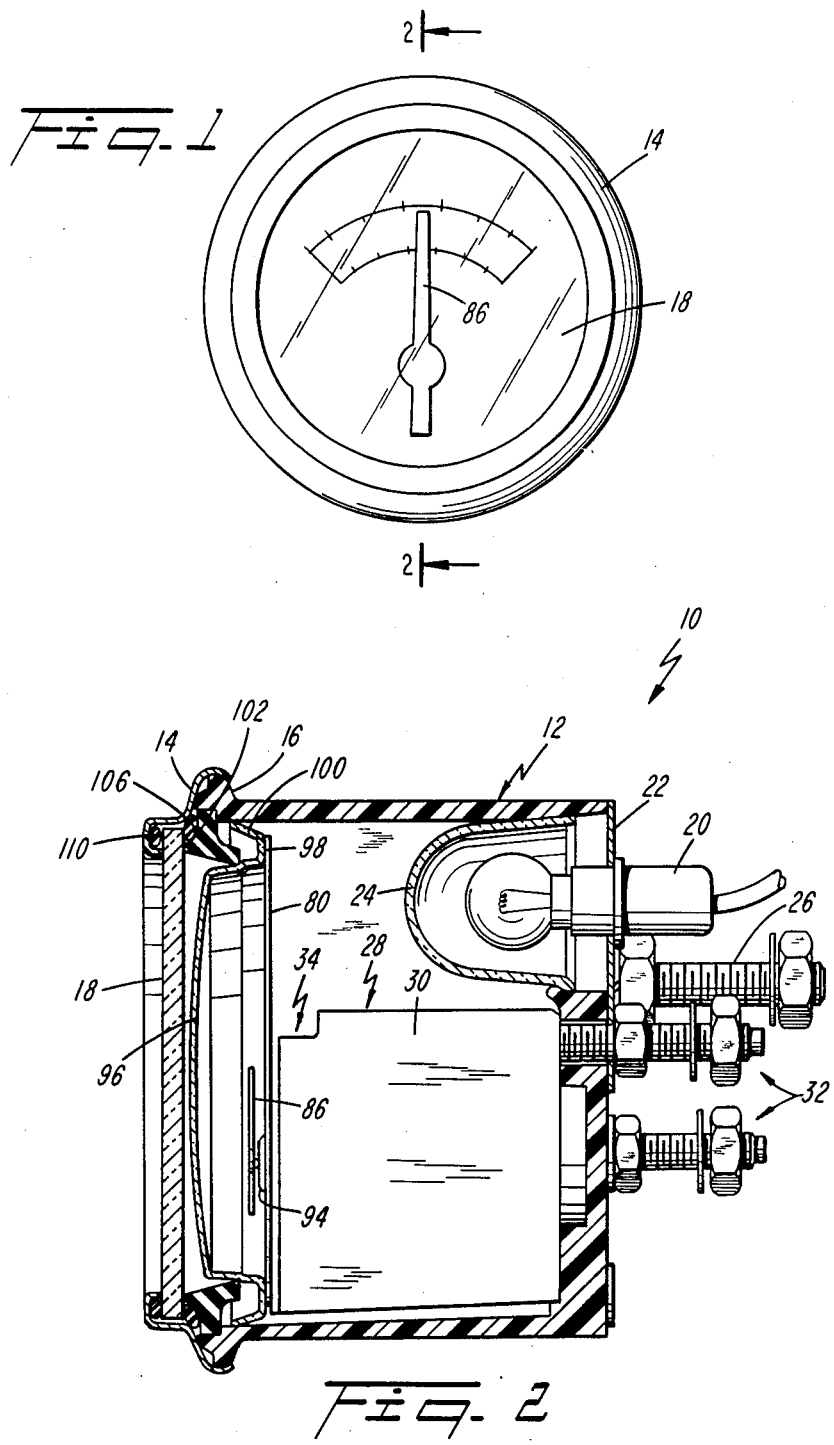

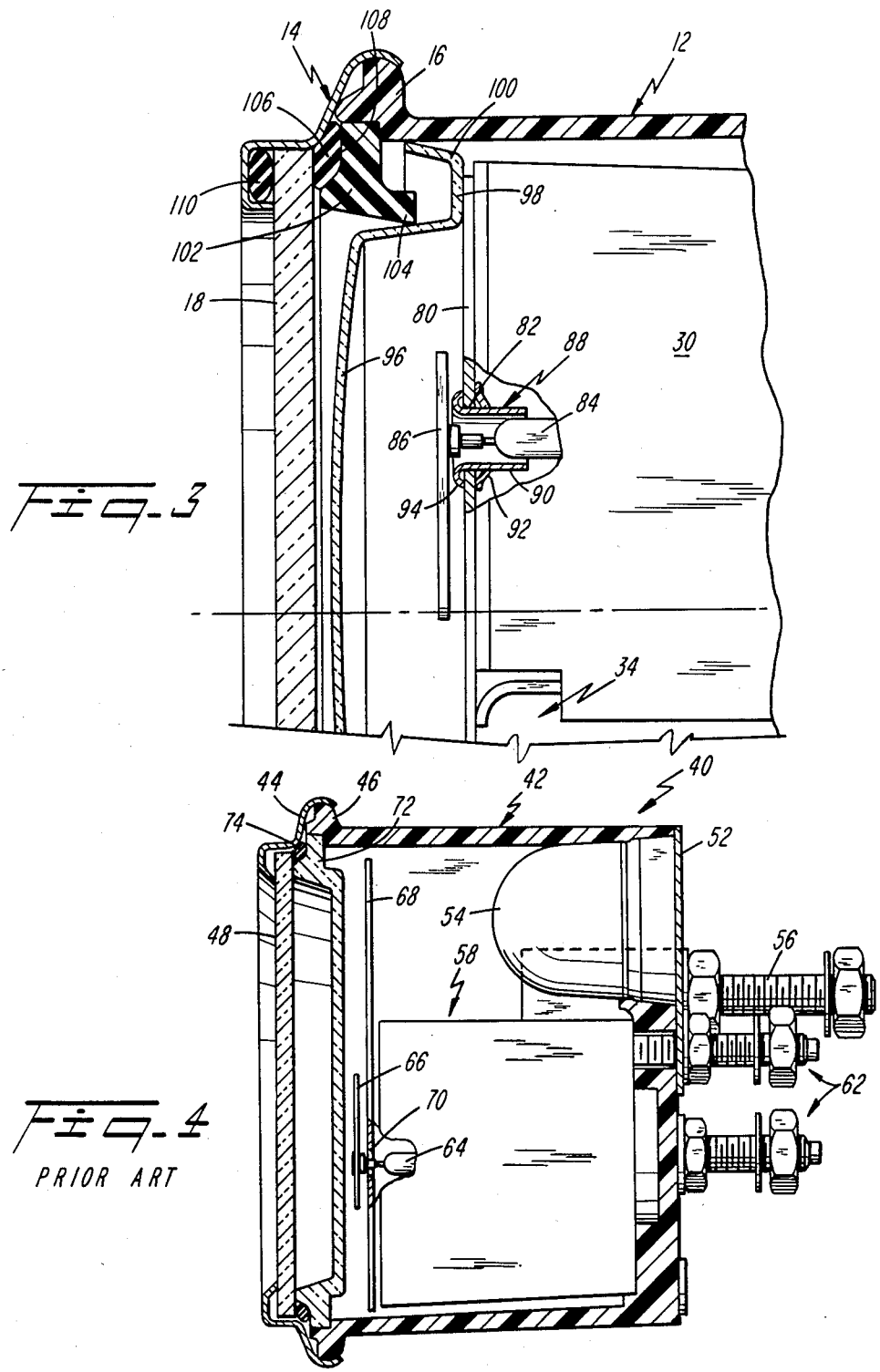

FOG-RESISTANT GAUGE

BACKGROUND OF THE INVENTION

1. Field of the Invention

This invention relates to an improved gauge for registering temperature, oil pressure, fuel level, and the like which has a case designed to eliminate or greatly reduce the fogging of the sight glass, viewing lens or window therein.

2. Description of Related Art Including Information Disclosed Under 37 CFR SS1.97–1.99.

As is well known, gauges used in vehicles, airplanes, and in industry are prone to fogging depending upon atmospheric conditions, especially when the sight glass or window lies in a horizontal plane. If the sight glass or window becomes cooler than the interior of the gauge, moisture within the gauge will deposit on the inside of the window. This can be a serious problem if the fogging effect renders the gauge unreadable.

Although this invention is not intended to be limited to electrically operated gauges, in a preferred embodiment the gauge movement constitutes a coil which is coupled to a remote sender. The sender is a variable resistance which controls the current flow through the coil, which in turn causes deflection of the needle. The needle rests on a bobbin which includes a magnet disposed within the coil. The sender or variable resistance could measure, as will be obvious to those skilled in the art, a wide variety of variables such as temperature, fuel level, oil pressure, or it could measure voltage or amperage. The sender then controls a flow of current to the movement within the gauge.

The flow of current through the gauge movement coil is a heat generator. Accordingly, the interior of the gauge and the sight glass window will be heated slightly. If the external temperature cools the sight glass window, the window can fog from the inside, depending upon atmospheric conditions. Such prior art gauges and senders are available commercially from, for example, the assignee of this invention, Datcon Instrument Company, for example, Series VIII, gauges, senders and meters.

It has been proposed in the past to use a double window having spaced-apart glass or plastic lenses in order to minimize fogging. See, for example, U.S. Pat. No. 2,701,969 wherein the space between the windows communicates with the external atmosphere, and U.S. Pat. No. 1,925,999 wherein a partial vacuum is created between the windows. In addition, in U.S. Pat. No. 3,530,723, an inner plastic bubble is used to isolate the gauge mechanism from a glass cover. In that patent, however, the space between the bubble and the glass cover, which functions as a sight window, is sealed.

While it is desirable from the standpoint of reducing the tendency to fog to provide two sight windows which function similar to a storm window, it is not desirable to seal the space between the two. If the seal is not perfect, or if the gauge is subjected to extreme atmospheric conditions, it can leak. If moisture enters the space between the two sight windows, it will then be very difficult to remove without totally dismantling the gauge. For this reason, the patentee in U.S. Pat. No. 3,530,723 uses a desiccant material in the sealed space. Furthermore, it is not desirable to have the space communicating with the ambient atmosphere as described in U.S. Pat. No. 2,701,969 because, in many environments, moisture will invade the space and fog the glass when it condenses, for example, on the upper surface of the inner lens.

SUMMARY OF THE INVENTION

The device of this invention is a fully sealed gauge which utilizes an inner lens or crystal between the gauge dial and the outer lens or crystal. However, the space between the inner lens and the outer lens is not sealed. Baffles, however, are provided to restrict the flow of air from within the gauge to the interior of the outer crystal. In addition, the port in the dial wherein the needle is mounted is surrounded by an eyelet which also acts as a baffle to restrict the flow of air therethrough. As will be subsequently explained, the metal case which houses the movement is also vented to cool the coil in the preferred embodiment. Finally, at least the inner surfaces of the outer and inner lenses are coated with an anti-fog, clear material.

Accordingly, it is an object of this invention to provide a fog-resistant gauge which will resist condensation within the viewing lens.

It is another object of this invention to provide a fog-resistant gauge having a fully sealed outer case with an inner lens disposed between the dial and the outer viewing lens.

It is yet another object of this invention to provide a fog-resistant gauge having a fully sealed outer casing, an inner lens disposed between the dial and the outer lens in which the flow of air from around the movement past the dial and inner lens to the outer lens is restricted by baffles carried by the inner lens.

It is yet another object to provide a fog-resistant gauge having an outer lens and an inner lens disposed between the outer lens and the dial coated with a fog-resistant clear coating wherein the flow of air from around the movement to the outer lens is baffled and wherein the movement is surrounded by an inner casing which is vented.

BRIEF DESCRIPTION OF THE DRAWING

These and other objects will become readily apparent with reference to the drawings and following description wherein:

FIG. 1 is a front view of the gauge of this invention.

FIG. 2 is a view partly in section taken along Lines 2—2 of FIG. 1.

FIG. 3 is an enlarged fragmentary view partly in section.

FIG. 4 is a view partly in section of a prior art gauge.

DESCRIPTION OF THE PREFERRED EMBODIMENTS

With attention to the drawings, the gauge of this invention 10 normally consists of an outer casing 12, a bezel ring 14 which engages the outer casing at a flange 16, and an outer lens 18. The gauge 10 may include an optional light 20 adapted to be coupled to a source of electrical energy (not shown). Light 20 is mounted in the back 22 of casing 12 within preferably a clear plastic lens 24 which is integral with the casing 12. The gauge then, as will be subsequently explained, is fully sealed.

The outer lens 18 is preferably at least 0.065 inches thick and constructed of polycarbonate plastic. In the alternative, the outer lens may be a laminated plastic sheet, such as that manufactured by Exxene Corporation of Corpus Christi, Tex. under the trademark "XEN Anti-Fog Laminate Sheet".

The plastic outer lens 18 may also be coated with a scratch-resistant coating on the outside surface. Clear scratch-resistant coatings are manufactured by MXL Industries, Inc. under the trademark "MXL Silicone Hard Coat"; "Exxene Corporation under the trademark "S-30" and "S-28" Silicone Coating; and General Electric Co., Silicone Products Department, under the trademark "SHC 1000".

As will be obvious to those skilled in the art, the outer lens 18 may also be glass.

Integral mounting bolts 26 are provided as necessary.

The gauge movement 28 is disposed within the outer casing 12 in an inner casing 30 normally constructed of light-weight metal. Casing 30 is secured to the back 22 of outer casing 12 by bolts 32. Casing 30 also has a vent slot 34 so that the interior thereof is in communication with the interior of outer casing 12.

With attention to FIG. 4, the conventional prior art gauge 40 similarly has an outer casing 42. A bezel ring 44 is intended to fit over a flange 46 and mount a lens 48. Similarly, an interior lens 54 is provided if a light (not shown) is desired. The back 52 mounts the lens 54 as well as mounting bolts 56. An inner case 58 is provided for containing the gauge movement. The inner case 58 is secured to back 52 by bolts 62.

The movement (not shown) enclosed within inner case 58 includes a bobbin 64 which mounts a needle 66. The dial 68 includes a port 70 through which bobbin 64 mounts needle 66.

The lens 48 is supported by a retaining ring 72 mounted within casing 42 and an O-ring 74 is provided to cushion lens 48.

As will be obvious to those skilled in the art, the gauge 40 can be subject to fogging. The coil (not shown) of the movement within the inner case 58 generates heat as current flows therethrough. Therefore, the interior of gauge 40 can be warmer than the ambient atmosphere which cools lens 48. If moisture is driven, for example, from the plastic bobbin 64, the moisture can condense on the inner surface of lens 48. The moisture then flows naturally through port 70 in dial 68 and onto the inner surface of lens 48.

With attention to FIGS. 2 and 3, the improvements of this invention are as follows:

As described in the prior art, a dial 80 is provided within case 12. Dial 80 contains a conventional port 82 within which the movement bobbin 84 mounts the needle 86.

An eyelet 88 is disposed within port 82 to surround the end of bobbin 84 and thereby minimize the passage of air through port 82.

Eyelet 88 consists of a sleeve 90 and opposed flanges 92 and 94 which are intended to grasp the edges of port 82 in dial 80. Sleeve 90 should be dimensioned to provide a minimum clearance with bobbin 84.

An inner lens 96 is disposed between dial 80 and outer lens 18. The inner lens includes a peripheral shelf portion 98 which rests on dial 80, and a baffle flange 100 which is disposed between the peripheral edge of dial 80 and the inner wall of outer case 12. Baffle 100 is not intended to seal the area between the dial 80 and outer case 12, but rather to restrict the air flow.

Inner lens 96 is preferably formed of polycarbonate plastic and is about 0.010 inches thick. The lens 96 is vacuum-formed in the preferred embodiment, but as will be obvious to those skilled in the art, the inner lens could be injection-molded in which instance it would be slightly thicker. As in the case of the outer lens, at least the inner surface of the inner lens is preferably coated with a permanent anti-fog coating.

For manufacturing convenience, the lenses 18 and 96 are dipped in the anti-fog coating. Accordingly, in the preferred embodiment, both inner and outer surfaces of lenses 18 and 96 are coated with the anti-fog coating.

The preferred anti-fog coating is obtained from MXL Industries, Inc. of Lancaster, Pennsylvania, and marketed under the name "Permanent Anti-Fog Coating". Suitable alternatives however are "I-5 Anti-Fog Coating" manufactured by Exxene Corporation of Corpus Christi, Tex., and "Anti-Fog Coating" manufactured by Air-Lock, Inc. of Milford, Conn.

Lens 96 is retained against dial 80 by a retaining ring 102 which includes an abutment member 104. Ring 102 may be constructed of a conventional plastic material. Lens 18 then rests on a sealing ring 106 which is dimensioned to fit within a corresponding groove 108 in ring 102. Bezel ring 14 then mounts an upper O-ring seal 110 and retains the entire assembly in place.

As will be obvious to those skilled in the art, the O-ring seal 110 should be constructed of a material resistant to aging caused by sunlight and ozone. Preferably, ethylene propylene is used, but other elastomers could also be used.

Accordingly, during operation of the gauge of this invention, as current flows through the coil (not shown) in inner case 30, heat will be generated. The heat is preferably dissipated by an air exchange through vent slot 34 in case 30. However, the air flow is not totally restricted between the interior of the outer case 12 and the space between dial 80 and inner lens 96, and between inner lens 96 and outer lens 18. The air flow is merely restricted by eyelet 88 and baffle 100. In the unlikely event that fog does form on, for example, the inner surface of the outer lens 18, it will gradually be reabsorbed and will not be trapped between the inner and outer lenses.

As will be obvious to those skilled in the art, the anti-fog improvements of this invention are not limited to a specific type of gauge but rather are applicable to a wide variety of different types of gauges which could be used. In addition, the device of this invention is not limited to an electrical guage, or to a gauge in which a coil and bobbin are used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a gauge for indicating variable conditions including an outer case housing a movement, a dial and a needle pivotally coupled to the movement mounted therein for indicating said conditions and an outer lens mounted in sealing engagement with the outer case for viewing the dial and needle the anti-fogging improvement comprising:

an inner case disposed within the outer case surrounding the movement, said inner case having a vent so that the interior of the inner case is in communication with the interior of the outer case;

an inner lens disposed between and mutually spaced away from the outer lens and the dial, the periphery of the inner lens mounting baffle means surrounding said lens and abutting the inner surface of said outer case for restricting communication between the interior of the outer case and the space between said lens;

anti-fog coating means covering at least the inner surface of said outer lens.

2. The improvement of claim 1 further comprising an anti-fog coating on at least the inner surface of said inner lens.

3. The gauge of claim 1 wherein said dial has a port and the movement includes a bobbin, an end of which extends through said port and mounts said needle thereon, the improvement further comprising:

an eyelet means disposed in said port surrounding the end of said bobbin for restricting communication between the interior of said inner case and the space between said dial and said inner lens.

4. The improvement of claim 3 wherein said baffle means comprises an integral peripheral flange.

5. The improvement of claim 4 wherein said inner lens is plastic having a thickness of about 0.01 inches.

6. The improvement of claim 3 wherein said eyelet comprises a sleeve extending through said port and surrounding the end portion of said bobbin.

* * * * *